US005381149A

United States Patent [19]

[11] Patent Number: 5,381,149

[45] Date of Patent: Jan. 10, 1995

Dougherty et al.

[54] BROADBAND ABSORBERS OF ELECTROMAGNETIC RADIATION BASED ON AEROGEL MATERIALS, AND METHOD OF MAKING THE SAME

[75] Inventors: Thomas K. Dougherty, Playa Del Rey; Norman H. Harris, Newhall; James R. Chow, Alhambra; Brian M. Pierce, Moreno Valley, all of Calif.

[73] Assignee: Hughes Aircraft Company, Los Angeles, Calif.

[21] Appl. No.: 870,532

[22] Filed: Apr. 17, 1992

[51] Int. Cl.[6] ........................ H01Q 17/00; B32B 7/02; G02F 1/17; G21K 1/10

[52] U.S. Cl. .................................... 342/1; 252/315.2; 252/315.6; 252/583; 252/587; 428/218; 501/12; 523/137

[58] Field of Search ............... 252/315.1, 315.2, 315.6, 252/315.7, 583; 342/1, 2, 3, 4; 501/12; 523/137; 428/218; 359/359

[56] References Cited

U.S. PATENT DOCUMENTS

| | | | |
|---|---|---|---|
| 2,441,422 | 5/1948 | Krieble et al. | 252/315.2 X |
| 2,829,981 | 4/1958 | Shapiro | 252/315.6 X |
| 3,109,031 | 10/1963 | Goldstein | 526/181 |
| 3,568,195 | 3/1971 | Wesch et al. | 342/1 |
| 4,432,956 | 2/1984 | Zarzycki et al. | 501/12 X |
| 4,495,239 | 1/1985 | Pusch et al. | 428/192 |
| 4,581,284 | 4/1986 | Eggert et al. | 428/283 |
| 5,079,334 | 1/1992 | Epstein et al. | 528/210 |
| 5,080,962 | 1/1992 | Hench | 428/218 |
| 5,122,291 | 6/1992 | Wolff et al. | 252/315.6 X |

OTHER PUBLICATIONS

"Electronics Designer's Handbook," Second Edition, edited by L. J. Giacolleto, McGraw–Hill, New York, 1977, pp. 2–47.

"Molecular Spectra and Molecular Structure. III. Electronic Spectra and Electronic Structure of Polyatomic Molecules," Van Nostrand, New York, 1966, p. 585.

"Solvent–modified Polymer Networks. Part I," J. R. Miller et al., J. Chem. Soc., Pt. 1, 218–225 (1963).

"Crystal Structure of Osmylated $C_{60}$: Confirmation of the Soccer Ball Framework," J. M. Hawkins et al., Science 252, 312–313 (1991).

"Ab initio self–consistent filed (SCF) calculations on borane icosahedra with zero, annie, or two substituted carbon atoms," T. A. Green, A. C. Switendick, and D. Emin, *J. Chem, Phys.*, 6815 (1988).

"Stretching Vibrations of CH Bonds in Spectra of Dicarbaclosododecarboranes," L. A. Leite and S. S. Buklalov, Bull, Acad Sci. USR Chem. Sci. 38, 2079–2082 (1989.

"The Dipole Moments of the Isomers of Dicarbadecaborane, $B_{10}H_{10}C_2H_2$," A. W. Laubengayer and W. R. Rysz, Inorg. Chem. 4, 1513–1514 (1985).

"Use of Dipole Moments to Determine the Structure of Halogen Derivatives of Ortho–and Meta–Carboranes," V. I. Stanko, et al., Zhurnal Strukturnoi Khimii 8, 928 (1967).

"Dipole Moments of Halogen Derivatives of Ortho- (List continued on next page.)

*Primary Examiner*—Richard D. Lovering
*Attorney, Agent, or Firm*—L. A. Alkov; W. K. Denson-Low

[57] ABSTRACT

An inhomogeneous broadband absorber of electromagnetic energy constructed from an aerogel-lossy dielectric composite, where the concentration of the lossy dielectric increase across its thickness such that the composite's dielectric properties vary from those of the aerogel to those of the lossy dielectric. Materials useful for serving as the lossy dielectric include polar molecules, polar icosahedral molecules, polyaniline electron-conducting polymers, and polyprrole electron-conducting polymers. Another inhomogeneous layer absorber is constructed from an aerogel that is intrinsically a lossy dielectric. The variation in dielectric properties is achieved by increasing the density of the aerogel across the thickness of the material. Aerogel materials for such an absorber include organic aerogels which have been pyrolized in an inert atmosphere to give vitreous carbon aerogels. Methods for fabricating these absorbers are described.

46 Claims, 3 Drawing Sheets

OTHER PUBLICATIONS

-and meta-Carboranes," A. I. Echeistova et al., Zhurnal Strukturnoi Khimii 8, 928, (1967), 933 (1967).

"The Dipole Moments of Boron and Carbon Brominated Carboranes," R. Marcua, et al., Inorg. Chem. 6, 572 (1967).

"Solid state phase transitions and molecular reorientation in ortho-and para-carborane: An Isomer effect," P. Beckmann et al.,, J. Chem, Phys. 72, 4600 (1980)).

"Chemistry of Decaborane-Phosphorus Compounds," H. D. Smith et al., vol. 4, No. 1, Jan. 1965.

"High-resolution solid-state B and CMASNMR of isosahedral carboranes," R. K. Harris et al., Spectochimica Acta 44A, 273 (1988).

"Highly resolved gradient patterns in glass by means of chemical vapor deposition," Wolkow et al., Mater. Res. Soc., Pittsburgh, Pa. (1990).

"Organic aerogels: A new type of ultrastructured polymer," R. W. Pekala et al., Report No. DE91-008500, UCRL-JC-106520.

"Polyaniline-ormasil Nanocomposites," S. J. Kramer et al., Department of Materials Science and Engineering and Department of Chemistry and Biochemistry and the Solid State Science Center, University of California, Los Angeles (1992).

"Microwave transport in the emeraldine form of polyaniline," H. H. S. Javadi et al., Phys. rev. B 39, 3579 (1989).

R. W. Pekala et al., "Organic aerogels: A new type of ultrastructured polymer," Report No. DE91-008500, UCRL-JC-106520, Feb. 1, 1991.

"Electromagnetic Wave Absorbers and Anechoic Chambers Through the Years," W. H. Emerson, IEEE Trans. on Antennas and Propagation AP-21, 484-489 (1973).

"Radar Cross Section Handbook," vol. 2, edited by G. T. Ruck, Plenum, N.Y., 1970, pp. 611-630.

"Low-density resorcinol-formaldehyde aerogels for direct-drive laser inertial confinement fusion targets," L. M. Hair et al., J. Vac. Sci. Technol. A, vol. 5, No. 4, Jul./Aug. 1988.

"Glasses from aerogels," J. Phalippou et al., J. Materials Science 25 (1990), 3111-3117.

"Bonding aerogels with polyurethanes," F. Matthews and M. D. Hoffman, Report No. DE90-03050, UCRL-101602, CONF-8905241-1; Contract No. W-7405--ENG-48; Lawrence Livermore National Lab., CA; Nov. 1989; Paper presented at the Society of Plastics Engineers Annual Technical Conference, Dallas, Tex., 7-11 May 1989.

"J. Store-Pellinen et al., IEEE 1989 Ultrasonic Symposium Proceedings" (IEEE Cat. No. 89 CH2791-2), vol. 1, 665 (1989).

"B. T. Khuri-Yakub et al., IEEE 1988 Ultrasonics Symposium Proceedings" (IEEE Cat. No. 88CH2578-3), vol. 1, 503 (1988).

"Development of low density silica aerogel as a capture medium for hyper-velocity particles," L. W. Hrubesh et al., Report No. DE91-008563, UCRL-CR-105858-SUMM, Contract No. W-7405-ENG-48, Lawrence Livermore National Lab, CA; Dec. 1990.

BROADBAND ABSORBERS OF ELECTROMAGNETIC RADIATION BASED ON AEROGEL MATERIALS, AND METHOD OF MAKING THE SAME

BACKGROUND OF THE INVENTION

This invention relates to materials which are boardband absorbers of electromagnetic (EM) radiation.

The fabrication of broadband, inhomogeneous layer absorbers has traditionally been an extremely difficult task because of the need to vary the dielectric properties of the layer from those of air to those of the lossy material. This need arises because an analysis of the Fresnel coefficient for reflected irradiance at the interface between air and a lossy material shows that the incident EM radiation will be strongly reflected unless the sharp discontinuity in electric and/or magnetic properties at the interface is smoothed out, i.e., the impedance or refractive index of the lossy material is matched to that of air ("Radar Cross Section Handbook," Volume 2, edited by G. T. Ruck, Plenum, New York, 1970, pp. 611-630).

In addition to the inhomogeneous layer absorber, a number of other absorbers have been developed to minimize the reflection of EM radiation at an air-material interface. The most important absorbers designs for flat plates are listed below ("Radar Cross Section Handbook," Volume 2, edited by G. T. Ruck, Plenum, New York, 1970, pp. 611-630.):

Single layer and multilayer Salisbury screen,
Magnetic Salisbury screen,
Single and multiple homogeneous layers (Dällenbach absorber,
Single layer and multilayer circuit analog absorbers,
$\mu=\epsilon$ absorber,
Geometric transition absorber,
Low-density absorber.

All of these absorbers, including the inhomogeneous layer absorber, have been utilized in the reduction of reflection in the microwave spectral region. However, not all of the above absorbers are used for IR and visible radiation. The principal reason is that the short wavelengths of IR and visible radiation dictate that the thickness of the various layers in these absorbers are on the micrometer and sub-micrometer scale. Thin-film deposition techniques must generally be employed to fabricate IR and visible radiation absorbers, and as a result, the single or multiple homogeneous layer design is preferred.

Short descriptions of the above absorbers designs are given below, along with their disadvantages.

Single layer and Multilayer Electric Salisbury Screen

The single layer electric Salisbury screen is a stack consisting of (1) a thin top layer of very lossy material with $\epsilon_{imag}>>\epsilon_{real}$, (2) a lossless layer of thickness l, and (3) a substrate of near-infinite conductivity, i.e., a metal. The minimum in normal incidence reflection occurs at the wavelength equal to $4l(\epsilon'_{real})^{\frac{1}{2}}$, where $\epsilon'_{real}$ is the real part of the dielectric constant of the lossless layer. The multilayer Salisbury screen broadens the reflection minimum by stacking lossy material—lossless layer combinations with different layer thicknesses.

The major disadvantage of the electric Salisbury screen is that it minimizes reflection through the interference of EM radiation reflected at the air-absorber interface and at the metallic substrate, and not through absorption. Consequently, the amount of reflection is very dependent on the angle of incidence for the EM radiation, and side-lobe reflections are not eliminated.

Magnetic Salisbury Screen

The absorber consists of (1) a thin lossy layer with $\mu_{imag}>>\epsilon_{real}$ and $\epsilon_{imag}$, and $\mu_{real}$ and $\mu_{imag}$ αl/ω, and (2) a perfectly conducting substrate for the thin lossy layer, i.e., a metal. The bandwidth of the magnetic Salisbury screen is determined by the frequency dependence of $\epsilon$ and $\mu$ for the lossy layer.

In addition to the disadvantages listed above for the electric Salisbury screen, the magnetic Salisbury screen has the difficulty of finding a material that can serve as the lossy layer.

Single and Multiple Homogeneous layers (Dällenbach Absorber

A single layer Dällenbach absorber consists of a homogeneous lossy layer backed by a metallic plate or a lossy material that can absorbed the radiation. The thickness of this layer determines the wavelength at which the reflection minimum occurs. Multiple layers with different thicknesses broaden the reflection minimum. In the case of a nonmagnetic, lossless ($\epsilon_{imag}=0$) layer, the reflection minimum occurs at a wavelength equal to $4l(\epsilon_{real})^{\frac{1}{2}}$. More details on Dällenbach absorbers can be found in the "Radar Cross Section Handbook," Volume 2, id., at pp. 611-630. As with the electric and magnetic Salisbury screens, the Dällenbach absorber relies upon the interference of the reflected EM radiation to minimize reflection, which is a disadvantage. An important advantage of the Dällenbach absorber is that it can be fabricated for use in the microwave IR and visible spectral regions.

Single Layer and Multilayer Circuit Analog Absorber

The single layer absorber is usually interpreted to mean a sheet of lossy circuit elements, e.g., dipoles or crossed dipoles, separated from a perfectly conducting surface by a lossless dielectric layer of thickness equal to $\lambda/4(\epsilon_{real})^{\frac{1}{2}}$ where $\lambda$ is the free-space wavelength at which the minimum in reflection is to occur and $\epsilon_{real}$ is the real part of the dielectric constant of the layer. The dipoles can be metallic whiskers, or similar lossy structures, with dimensions appropriate for the wavelength of radiation that must be absorbed. Crossed dipoles are helpful in reducing the polarization dependence of the reflected radiation. The multilayer circuit analog absorber broadens the reflection minimum by stacking lossy sheet—lossless dielectric layer combinations with different layer thicknesses.

The same disadvantages cited for the electric Salisbury screen apply to the circuit analog absorbers. Furthermore, the circuit analog absorber is more expensive to fabricate that the Salisbury screen. Fabrication is becoming more sophisticated with the utilization of lithographic techniques to etch the circuit elements in a suitable substrate.

$\mu=\epsilon$ Absorber

This absorber is based on the fact that the normal incidence reflection coefficient is zero if the absorbing material has $\mu_{real}=\epsilon_{real}$ and is lossy and thick enough so that any reflection from the backing can be ignored.

The disadvantage with this approach is finding materials with the above magnetic and electric properties.

The only materials known to have these properties over modest frequency ranges in the microwave region are the ferrites. No materials are known to have such properties in the IR and visible spectral regions.

Geometric Transition Absorber

This absorber is characterized by a geometrical transition from air into a lossy medium. Pyramids or wedges composed of synthetic sponge rubber or plastic foam that is loaded with electrically lossy material, e.g., carbon particles, are examples of geometric transition absorbers.

The disadvantage with this approach is that the interface with air is not planar, which makes geometric transition absorbers impractical for many applications. However, this non-planar interface results in reflection minimization over a wider range of angles of incidence. It is also noted that the fabrication of geometric transition absorbers is much more difficult for the visible and IR spectral regions than for the microwave region.

Low-density Absorber

In a low-density absorber, the index matching to air is achieved by using materials of very low density such that their electric and magnetic properties approach those of air. Absorption is obtained by distribution a lossy material in small concentration homogeneously throughout the low-density material. An example of such an absorber is STYROFOAM loaded with carbon particles. Note that the difference between this absorber and the inhomogeneous layer absorber is that the lossy material has a concentration gradient in the inhomogeneous layer absorber.

The disadvantage with low-density absorbers is that they must be made very thick and their mechanical properties have not been very good. As discussed below, aerogels are very interesting low-density materials because their thermal, electric and magnetic properties are just as good or better than conventional low-density foams, and the mechanical and optical properties of aerogels are a great improvement over these foams.

Inhomogeneous Layer Absorber

As discussed in the opening paragraphs, the inhomogeneous layer absorber presents a minimum discontinuity at the air-absorber interface by increasing the loss in a smooth fashion so that the absorber is like air at one face and like a perfect conductor at the opposite face. This absorber is discussed in greater detail below because it is the subject of the invention.

Although no experiment demonstration of aerogel for impedance matching of EM radiation across an air-material interface is known, there have been experimental demonstrations of silica aerogels as matching layers for acoustical waves. These demonstrations are described in J. StorPellinen et al., IEEE 1989 Ultrasonics Symposium Proceedings (IEEE Cat. No. 89CH2791-2), Vol. 1, 665 (1989); B. T. KuriYakub et al., IEEE 1988 Ultrasonics Symposium Proceedings (IEEE Cat. No. 88CH2578-3), Vol. 1, 503 (1988).

The difficulty with the inhomogeneous layer absorber has been its fabrication. In accordance with this invention, aerogel materials offer a way to fabricate broadband inhomogeneous layer absorbers.

SUMMARY OF THE INVENTION

One novel aspect of the invention is that a broadband inhomogeneous layer absorber of EM radiation can be constructed from an aerogel-lossy dielectric (A-LD) composite, where the concentration of the lossy dielectric increases across the thickness of the composite such that the dielectric properties of the composite vary from those of the aerogel (air) to those of the lossy dielectric. Materials that can serve as the lossy dielectric for the A-LD composite absorber in the microwave portion of the EM spectrum include: (1) polar molecules, e.g., polar icosahedral molecules such as ortho-carborane and meta-carborane, propylene carbonate, nitromethane, and methanol, and (2) electron-conducting polymers, e.g., polyaniline and polyprrole. However, conventional absorptive materials may also be loaded in the aerogel material in accordance with this aspect of the invention.

A second novel aspect of the invention is that an inhomogeneous layer absorber can be constructed from an aerogel that is intrinsically a lossy dielectric. The variation in dielectric properties is achieved by increasing the density of the aerogel across the thickness of the material. The low density/high porosity side of the material will have dielectric properties close to those of air, while the high density/low porosity side will have dielectric properties close to those of the lossy dielectric. Aerogels for this approach to an inhomogeneous layer absorber in the microwave portion of the EM spectrum include inorganic aerogels, and organic aerogels that have been pyrolized in an inert atmosphere to give vitreous carbon aerogels.

A third novel aspect of the invention is that inhomogeneous layer absorbers in the microwave spectral region can be fabricated that have excellent optical properties in the visible spectral region. Of course, this feature is dependent upon the lossy material being transparent in the visible spectral region. The excellent optical properties of aerogels principally arise from their very small pore sizes, which are less than the wavelengths of visible light, i.e., visible light is scattered very little within the aerogel.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
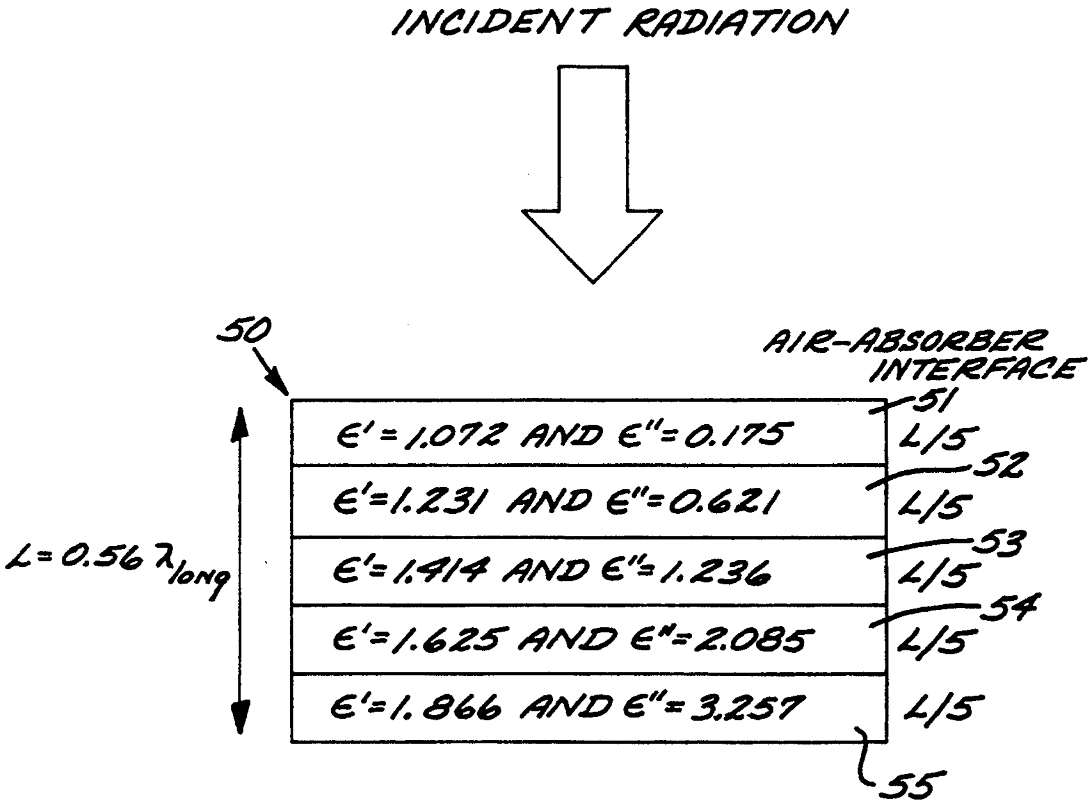
FIG. 1 is a simplified diagrammatic cross-sectional view of a five-layer discrete approximation to an inhomogeneous layer absorber in accordance with this invention.

Aerogels are highly porous solids that generally acquire the dielectric properties of the medium in which they are immersed. If ambient air is the medium, then the dielectric properties of aerogels are very close to those of ambient air. Consequently, an electromagnetic (EM) wave propagating through the atmosphere will undergo very little reflection at the atmosphere-aerogel interface.

Aerogel solids offer a novel approach to air-material index matching, and hence to the fabrication of broadband, inhomogeneous layer absorbers, by providing (1) a homogeneous structure with dielectric and magnetic properties close to those of air, in which a lossy material can be distributed to produce a composite with the desired features of a broadband, inhomogeneous layer absorber, or (2) an inhomogeneous structure that varies in porosity so that it either behaves intrinsically as a broadband, inhomogeneous layer absorber, or is made one by the addition of the suitable lossy material.

It is not difficult to find lossy materials for the different regions of the EM spectrum. For example, electron-conducting polyaniline polymers strongly absorb EM radiation in the visible and near-IR spectral regions, as well as in the microwave frequency range. Almost all molecular systems absorb infrared radiation over a wide range of frequencies through the vibrations of their chemical bonds. A large number of materials that exhibit dielectric loss or magnetic loss at microwave frequencies has been identified (W. H. Emerson, IEEE Trans. on Antennas and Propagation AP-21, 484-489 (1973); Emerson and Cuming catalog on microwave absorbers). Emerson and cuming, "High-Loss dielectrics Microwave Absorbers," 869 Washington St., Canton, Mass. 02021, Mar. 1, 1986.

The major advantage that aerogel solids have over conventional low density foams like STYROFOAM is that aerogels are prepared using sol-gel-processing, which allows great control over the nature of the aerogel, e.g., porosity, size of pores, chemical composition, and the incorporation of an exemplary lossy material into the aerogel (C. J. Brinker and G. W. Scherer, "Sol-Gel Science—The Physics and Chemistry of Sol-Gel Processing," Academic, New York, 1990). This control makes it possible to tune the electric and/or magnetic properties of loaded or unloaded aerogels so that broadband, inhomogeneous layer absorbers can be realized.

Sol-gel-derived silica aerogels have a combination of optical, mechanical, and thermal insulating properties that give the aerogels advantages over other foam-like materials; visibly transparent; thermal conductivity >0.014 W/mk without evacuation, and >0.006 W/mk if evacuated, or R values of 7−15/in at 1 atm; compressive strength of >20–30 psi.

The origin of these properties is the very small pore size of 10 to 1000Å in diameter (less than the wavelengths of visible light) and the extremely high porosity at >92%. With the further ability to tune electric and magnetic properties, aerogels in accordance with this invention can be used to provide broadband, inhomogeneous layer absorbers.

The inhomogeneous layer absorber presents a minimum discontinuity at the air-absorber interfere, and has a progressively increasing loss so that the transmitted EM field is completely absorbed. The key to the design of inhomogeneous layer absorbers is the variation in electric and magnetic properties across the thickness of the layer.

Table 8-6 of "Radar Cross Section Handbook," Volume 2, id, at pp. 611–630, contains 12 different variations in electric and magnetic properties for inhomogeneous layer absorbers. Four of these variations are tabulated below.

| Type of Variations | ε′ (z) | ε″ (z) | μ′ (z) | μ″ (z) | Minimum 1/λo |
|---|---|---|---|---|---|
| Exponential 1 | 2z/l | 5z/l − 1 | 1 | 0 | 0.56 |
| Exponential 2 | 1.072 | 03(3.3z/l − 1) | 3.3z/l | 50z/l − 1 | 0.5 |
| Five-Layer | 1.072 | 0.175 for 0.2l | 1 | 0 | 0.56 |
| discrete approx | 1.231 | 0.621 for 0.2l | 1 | 0 | |
| to exponential 1 | 1.414 | 1.236 for 0.2l | 1 | 0 | |
| | 1.625 | 2,085 for 0.2l | 1 | 0 | |
| | 1.866 | 3,257 for 0.2l | 1 | 0 | |
| Linear | 1 | 3z/l | 1 | 0 | 0.55 |

The ε′(z) and ε″(z) terms are the real and imaginary parts of the electric permittivity, where z is the thickness position; the μ′(z) and μ″(z) terms are the real and imaginary parts of the magnetic permeability; and the Minimum $1/\lambda_o$ refers to the minimum thickness of the layer in terms of the longest wavelength EM radiation that is to be absorbed. The fabrication of inhomogeneous layer absorbers with lossy profiles such as those given above and in Table 8-6 of "Radar Cross Section Handbook," Volume 2, id., at pp. 611–630, is covered in the next section.

Note that the frequency range for an inhomogeneous layer absorber is determined by the thickness of the layer and the frequency range over which the variations in electric and magnetic properties are maintained, i.e., the frequency-dependence of the complex permittivity and permeability.

FIG. 1 illustrates in simplified schematic form an absorber 50 of electromagnetic radiation in accordance with the invention. The absorber 50 is a five-layer approximation to an inhomogeneous layer absorber with the following exponential variations in ε′ and ε″:

$$\epsilon'(z)=2^{z/L}$$

$$\epsilon''(z)=5^{z/L}-1$$

where L is the minimum thickness of the inhomogeneous layer, and is equal to 0.56 times the longest wavelength of electromagnetic radiation to be absorbed.

Figure 2:
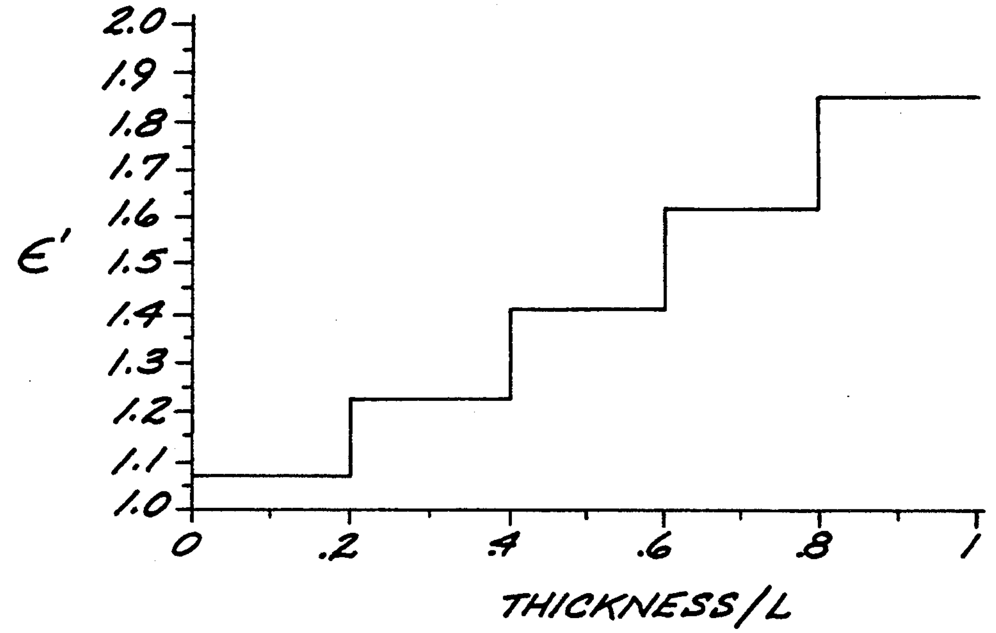
FIGS. 2 and 3 illustrate the discrete approximations to the exponential variations in the real and imaginary parts of the electrical permittivity of the absorber of FIG. 1.
Figure 3:
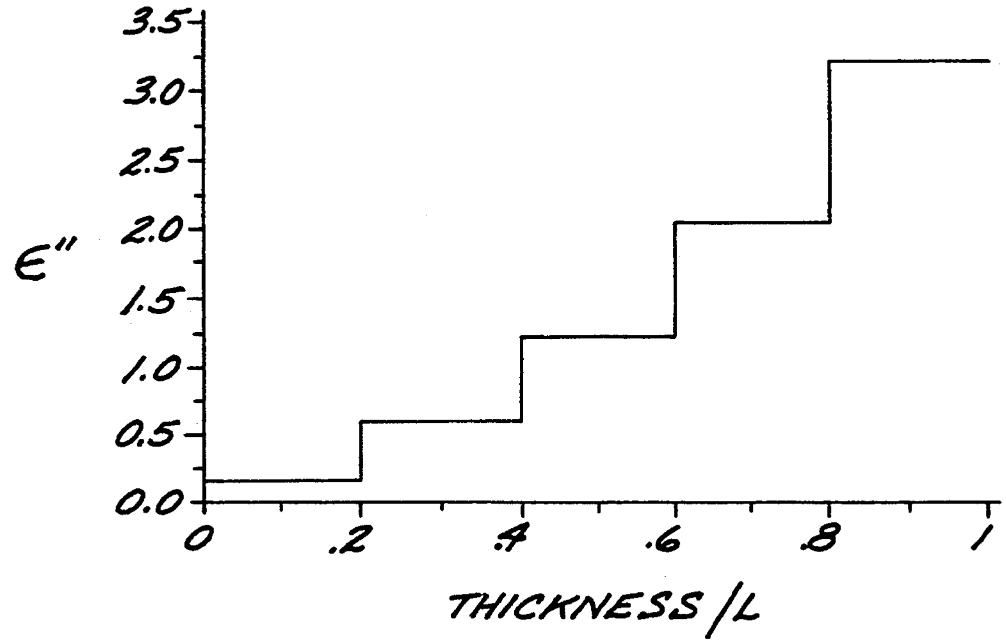

Thus, the absorber 50 includes five layers 51-55. Each layer has a thickness equal to L/5. Layer 51 is characterized by an electric permittivity of ε′=1.072 and ε″=0.175. layer 52 is characterized by an electric permittivity of ε″=1.231 and ε″=0.621. Layer 53 is characterized by an electric permittivity of ε″=1.414 and ε″=1.236. Layer 54 is characterized by an electric permittivity of ε″=1.625 and ε″=2.085. Layer 55 is characterized by an electric permittivity of ε″=1.866 and ε″=3.257. The discrete approximations to the exponential variations in ε″(z) and ε″(z) are further illustrated in FIGS. 2 and 3.

FABRICATION OF INHOMOGENEOUS LAYER ABSORBERS

Two fabrication methods are described with emphasis on broadband inhomogeneous layer absorbers for the microwave portion of the EM spectrum. The first method includes preparing an aerogel-lossy dielectric (A-LD) composite, where the concentration of the lossy dielectric increases across the thickness of the composite such that the dielectric properties of the composite vary from those of the aerogel (air) to those of the lossy dielectric. Exemplary materials that can serve as the lossy dielectric for the A-LD composite absorber in the microwave portion of the EM spectrum are: (1) polar molecules, e.g., polar icosahedral molecules such as ortho-carborane and meta-carborane, water, propylene carbonate, nitromethane and methanol; and (2) electron-conducting polymers, e.g., polyaniline and polypyrrole.

The second method is to employ an aerogel that is intrinsically a lossy dielectric. The variation in dielectric properties is accomplished by increasing the density of the aerogel across the thickness of the material. The low-density/high-porosity side of the material will have dielectric properties close to those of air, while the high-density/low-porosity side will have dielectric properties close to those of the lossy dielectric. Exemplary aerogels for this method in the microwave portions of the EM spectrum are inorganic aerogels, and organic aerogels that can be transformed into vitreous carbon aerogels.

Additional details on the two fabrication methods are given below.

A. Homogeneous Aerogel—Inhomogeneous Lossy Material

The preparation of homogeneous aerogels and the inhomogeneous incorporation of selected microwave-absorbing materials into these aerogels are described in this section.

1. Homogeneous Aerogel

Solution-gelation (sol-gel) processing has been used to prepare homogeneous, transparent inorganic aerogels with sizes on the order of 2.5 cm×4.5 cm×16 cm and densities as low as 0.003 g/cm (L. W. Hrubesh et al., "Development of low density silica aerogel as a capture medium for hypervelocity particles," Report No. DE91-008563, UCRL-CR-10585-SUMM, Contract No. W-7405-ENG-48, Lawrence Livermore national Lab., CA; December 1990), and homogeneous organic aerogels synthesized from mixtures of resorcinol and formaldehyde or melamine and formaldehyde (R. W. Pekala et al., "organic aerogels: A new type of ultrastructured polymer," Report No. DE91-008500, UCRL-JC-106520). A general reference on sol-gel processing is C. J. Brinker and G. W. Scherer, "Sol-Gel Science—The Physics and Chemistry of Sol-Gel Processing," Academic, New York, 1990.

In the case of an inorganic oxide aerogel like the silica aerogels, the gel is first prepared by the acid or base-catalyzed hydrolysis and condensation of the appropriate metal alkoxide(s) in an alcoholic media. The gel is then aged for several days at a temperature between room temperature and the boiling point of the solvent. The longer this time, the higher is the eventual density of the gel. After this time, the gel is transferred to an autoclave calve for supercritical drying to remove the solvent from the gel without collapsing its structure. Carbon-dioxide ($CO_2$) gas in the supercritical liquid state can be used to assist in the supercritical drying of the gel.

2. Aerogel-polar Molecule Composite

An exemplary five-layer discrete approximation to an exponential inhomogeneous layer absorber using homogeneous silica aerogel layers containing different concentrations of the microwave-absorbing polar carboranes is described wherein the layers have the thicknesses and electric permittivity described above with respect to FIG. 1. It is to be understood, however,that layer absorbers having greater or lesser numbers of layers could be employed in accordance with this invention.

The first step in the fabrication process is to take five homogeneous silica aerogels and load them with different concentrations of a polar carborane like orthocarborane. This loading can be accomplished by conventional vapor deposition of different amounts of ortho-carborane into each of the five homogeneous silica aerogels. One approach to the vapor deposition of ortho-carborane into an aerogel is to first place the aerogel and 0.1–100 grams of ortho-carborane in two separate chambers. These chambers are then attached to a vacuum manifold. After evacuating the vacuum manifold and the chambers, the valve connecting the manifold to the pump is closed. While maintaining the chamber containing the aerogel at room temperature, the chamber containing the ortho-carborane is heated to produce a vapor pressure of ortho-carborane needed to impregnate the aerogel with the desired amount of ortho-carborane. The time required for the deposition process can range from one to either hours. The temperature of the chamber containing the aerogel can be varied to influence the deposition. For example, if this temperature is kept below room temperature, then more ortho-carborane will be deposited or impregnated in the aerogel. Alternatively, this loading could also be done by immersion of the aerogels in five solutions containing different amounts of ortho-carborane. The specific concentrations should be those that result in values of $\epsilon'$ and $\epsilon''$ close to 1.072 and 0.175 for the first aerogel composite layer; 1.231 and 0.621 for the second layer; 1.414 and 1.236 for the third layer; 1.625 and 2.085 for the fourth layer; and 1.866 and 3.257 for the fifth layer.

Figure 4:
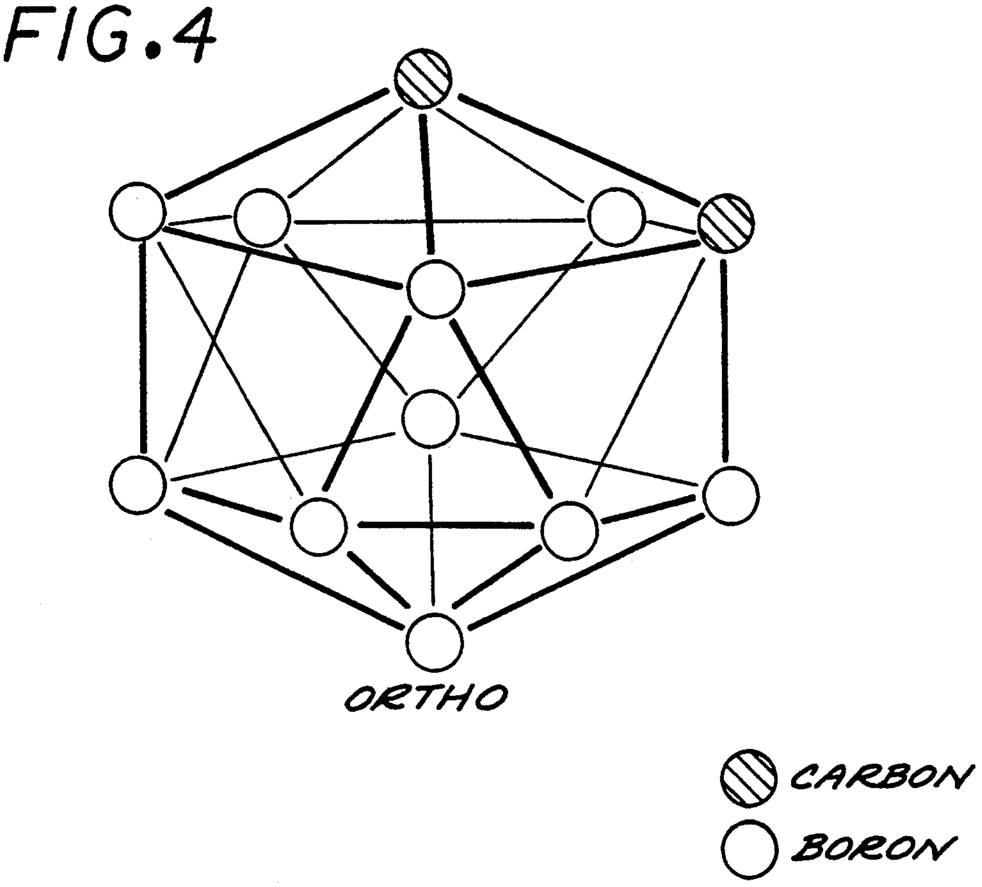
FIGS. 4 and 5 illustrate the molecular structures of two polar molecules, ortho-carbonate and meta-carborane.
Figure 5:
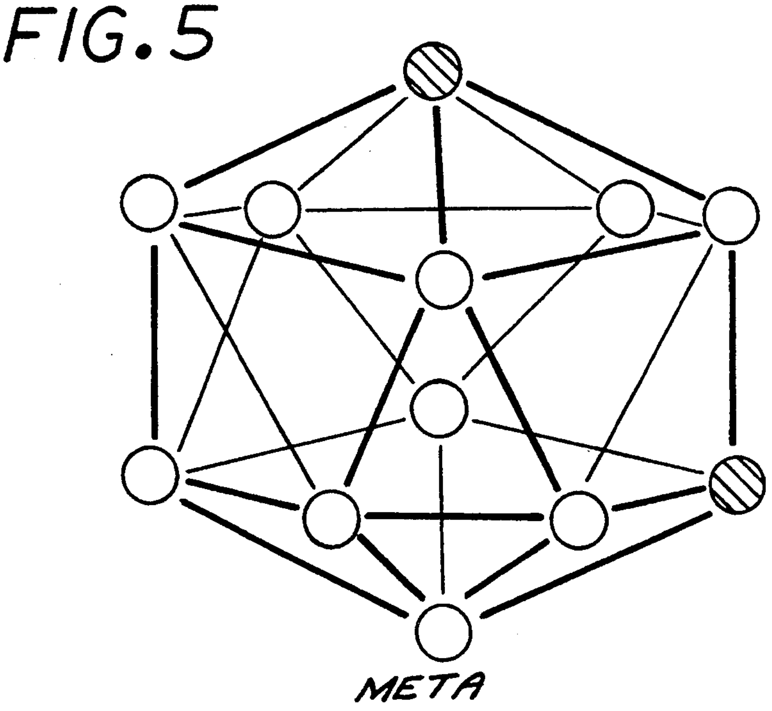

The molecular structures of two polar icosahedral units, ortho-carborane and meta-carborane, are illustrated in FIGS. 4 and 5. (although not shown for clarity in FIGS. 4 and 5, each carbon and boron atom has one hydrogen atom bonded to it.) Such polar carboranes are commercially available, e.g., from Dexsil Corporation, One Hamden Park Dr., Hamden, Conn. 06517.

As discussed above, the wavelength of the lowest frequency EM radiation to be absorbed defines the minimum thickness of the layer. Thus, if all microwave radiation at frequencies greater than 10 GHz is to be absorbed, then the total thicknesses of the inhomogeneous layer should be 1.68 cm. Each of the five layers would have a thickness of 0.336 cm. These thicknesses can be obtained by cutting and/or grinding the five aerogel composite monoliths down to size.

The stack of five layers can then be assembled by using a polyurethane adhesive (F. Mattews and M. D. Hoffman, "Bonding aerogels with polurethanes," Report No. DE90-03050, UCRL-101602, CONF-8905241-1; Contract No. W-7405-ENG-48; Lawrence Livermore National Lab., Calif.; November 1989; Paper presented at the Society of Plastics Engineers Annula Technical Conference, Dallas, Tex., 7-11 May 1989.)

the above methods could also be used to prepare an inhomogeneous layer with microwave-absorbing polar molecules other the ortho-carborane, e.g., meta-carborane, water, propylene carbonate, nitromethane, and methanol.

3. Polar Molecule Covalently Attached to Serogel Composite

An exemplary five-layer discrete approximation to an exponential inhomogeneous layer absorber is described using homogeneous silica aerogel layers containing different concentrations of the microwave-absorbing polar carboranes. The distinction between this composite and the silica aerogel-polar carborane composite described in the preceding section is the covalent attachment of polar carborane molecular units to the silica network.

The first step in the fabrication process is to prepare a homogeneous sol-gel by the acid or base-catalyzed hydrolysis and condensation of mixtures of a) $Si(OEt)_3$ or $SiMe_2OH$ bonded to one of the carbon atoms in ortho-carborane with b) a silicon tetraalkoxide in an alcoholic media. The synthesis of ortho-carborane-$Si(OEt)_3$ and ortho-carborane-$SiMe_2OH$ follows the procedures described in the co-pending U.S. patent application, Ser. No. 07/870,023, filed Apr. 17, 1992, and now U.S. Pat. No. 5,317,058, attorney docket PD-91762, entitled "Microwave-Adsorbing Materials Containing Polar Icosahedral Molecular Units and Methods of Making the Same," by B. M. Pierce, T. K. Dougherty, N. H. Harris, J. R. Chow and D. H. Whelan, assigned to a common assignee with the present application. The entire contents of this co-pending application are incorporated herein by this reference. The concentration of ortho-carborane-$Si(OEt)_3$ or ortho-carborane-$SiMe_2OH$ should be one that results in values of $\epsilon'$ and $\epsilon''$ close to 1.072 and 0.175 for the aerogel composite layer.

The second step is to pour the sol-gel into a container so that a sol-gel layer is formed with the desired thickness. As discussed above, the wavelength of the lowest frequency EM radiation to be absorbed defines the minimum thickness of the layer. Thus, if all microwave radiation at frequencies greater than 10 GHz is to be absorbed, then the total thickness of the inhomogeneous layer should be 1.68 cm. Each of the five layers would have a thickness of 0.336 cm. After allowing the above sol-gel layer to age for one to three days, a second sol-gel is prepared with concentrations of ortho-carborane-$Si(OEt)_3$ or ortho-carborane-$SiMe_2OH$ that result in values of $\epsilon'$ and $\epsilon''$ close to 1.231 and 0.621 for the second aerogel composite layer. This second sol-gel is then poured on top of the first aged layer to the desired layer thickness.

After allowing the second sol-gel layer to age for one to three days, a third sol-gel is prepared with concentrations of ortho-carborane-$Si(OEt)_3$ or ortho-carborane-$SiMe_2OH$ that result in values of $\epsilon'$ and $\epsilon''$ close to 1.414 and 1.236 for the third aerogel composite layer. This third sol-gel is then poured on top of the second aged layer to the desired layer thickness.

After allowing the third sol-gel layer to age for one to three days, a fourth sol-gel is prepared with concentrations of ortho-carborane $Si(OEt)_3$ or ortho-carborane-$SiMe_2OH$ that result in values of $\epsilon'$ and $\epsilon''$ close to 1.625 and 2.085 for the fourth aerogel composite layer. This fourth sol-gel is then poured on top of the third aged layer to the desired layer thickness.

After allowing the fourth sol-gel layer to age for one to three days, a fifth sol-gel is prepared with concentrations of ortho-carborane-$Si(OEt)_3$ or ortho-carborane-$SiMe_2OH$ that result in values of $\epsilon'$ and $\epsilon''$ close to 1.866 and 3.257 for the fifth aerogel composite layer. This fifth sol-gel is then poured on top of the fourth aged layer to the desired layer thickness. The fifth sol-gel layer is then allowed to age for one to three days.

The third step involves transforming the stack of gels into aerogels using the $CO_2$ supercritical or hypercritical drying procedure outlined above in Section 1. The paper "Glasses from aerogels," J. Phalippou et al., J. Materials Science 25 (1990), 3111–3117, illustrates the use of $CO_2$ supercritical drying in the preparation of monolithic silica aerogels. In $CO_2$ supercritical drying, the alcohol solvent in the gel is replaced by $CO_2$ in the supercritical state. The experimental conditions for $CO_2$ supercritical drying in an autoclave are 50° C. and 7.5 MPa. The $CO_2$-alcohol solvent exchange can be assisted by such intermediate solvents as acetone or diethylether.

An alternative synthesis procedure is to first synthesize five homogeneous aerogels loaded with different concentrations of the absorber and then to assemble the layers together. The first step in this alternate fabrication process is to prepare five homogeneous gels by the acid or base-catalyzed hydrolysis and condensation of mixtures of a) $Si(OEt)_3$ or $SiMe_2OH$ bonded to one of the carbon atoms in ortho-carborane with b) a silicon tetraalkoxide in an alcoholic media. The synthesis of ortho-carborane-$Si(OEt)_3$ and ortho-carborane-$SiMe_2OH$ follows the procedures described in the co-pending U.S. patent application, Ser. No. 07/870,023, filed Apr. 17, 1992 and now U.S. Pat. No. 5,286,890, attorney docket PD-91762, entitled "Microwave-Adsorbing Materials Containing Polar Icosahedral Molecular Units and Methods of Making the Same," referenced above. The concentration of ortho-carborane-$Si(OEt)_3$ or ortho-carborane-$SiMe_2OH$ is different for each of the five gels. The specific concentrations should be those that result in values of $\epsilon'$ and $\epsilon''$ close to 1.072 and 0.175 for the first aerogel composite layer; 1.231 and 0.621 for the second layer; 1.414 and 1.236 for the third layer; 1.625 and 2.085 for the fourth layer; and 1.866 and 3.257 for the fifth layer.

The second step in this alternative procedure is to cure the gels at room temperature for a period of time.

The third step is to transfer the gels to an autoclave and follow the standard procedures for $CO_2$ supercritical drying to remove the solvent from the gels, and thereby form the aerogels.

As discussed above, the wavelength of the lowest frequency EM radiation to be absorbed defines the minimum thickness of the layer. Thus, if all microwave radiation at frequencies greater than 10 GHz are to be absorbed, then the total thickness of the inhomogeneous layer should be 1.68 cm. Each of the five layers would have a thickness of 0.336 cm. These thicknesses can be obtained by cutting and/or grinding the five aerogel composite monoliths down to size. The stack of five layers can then be assembled by using a polyurethane adhesive.

The above approaches could also be used to prepare an inhomogeneous layer with microwave energy-absorbing molecules other than ortho-carborane, e.g., meta-carborane.

4. Conducting Polymer Covalently Attached to Aerogel Composite

An exemplary five-layer discrete approximation to an exponential inhomogeneous layer absorber is described using homogeneous silica aerogel layers containing different concentrations of microwave-absorbing polyaniline in the acid-complexed or electron-conducting state (H.H.S. Javadi et al., Phys. Rev. B 39, 3579 (1989)).

The first step in the fabrication process is to prepare a homogeneous sol-gel by the acid or base-catalyzed hydrolysis and condensation of mixtures of a) $SiMe_2OH$ bonded to either the meta- or para-carbon of aniline with b) a silicon tetraalkoxide, e.g., $Si(OEt)_4$, in an alcoholic media. The synthesis of aniline-$SiMe_2OH$ follows the procedure described in the co-pending U.S. patent application, Ser. No. 07/870,432, filed Apr. 16, 1992, and now U.S. Pat. No. 5,286,890, attorney docket PD-91401, entitled "Aromatic Amine Terminated Silicon Monomers, Oligomers and Polymers Thereof," referenced above. The formula for $SiMe_2OH$ bonded to the meta-carbon of aniline is given in this co-pending application as formula ID; the formula for $SiMe_2OH$ bonded to the para-carbon of aniline is given as formula IID. The concentration of aniline-$SiMe_2OH$ should be one that results in values of $\epsilon'$ and $\epsilon''$ close to 1.072 and 0.175 for the layer in the polyaniline-silica aerogel composite (see below).

The second step is to pour the sol-gel into a container so that a sol-gel layer is formed with the desired thickness. As discussed above, the wavelength of the lowest frequency EM radiation to be absorbed defines the minimum thickness of the layer. Thus, if all microwave radiation at frequencies greater than 10 GHz is to be absorbed, then the total thickness of the inhomogeneous layer should be 1.68 cm. Each of the five layers would have a thickness of 0.336 cm. After allowing the above sol-gel layer to age for one to three days, a second sol-gel is prepared with a concentration of aniline-$SiMe_2OH$ that results in values of $\epsilon'$ and $\epsilon''$ close to 1.231 and 0.621 for the second aerogel composite layer. This second sol-gel is then poured on top of the first aged layer to the desired layer thickness.

After allowing the second sol-gel layer to age for one to three days, a third sol-gel is prepared with a concentration of aniline-$Si(OEt)_3$ that results in values of $\epsilon'$ and $\epsilon''$ close to 1.414 and 1.236 for the third aerogel composite layer. This third sol-gel is then poured on top of the second aged layer to the desired layer thickness.

After allowing the third sol-gel layer to age for one to three days, a fourth sol-gel is prepared with a concentration of aniline-$SiMe_2OH$ that results in values of $\epsilon'$ and $\epsilon''$ close to 1.625 and 2.085 for the fourth aerogel composite layer. This fourth sol-gel is then poured on top of the third aged layer to the desired layer thickness.

After allowing the fourth sol-gel layer to age for one to three days, a fifth sol-gel is prepared with a concentration of aniline-$SiMe_2OH$ that results in values of $\epsilon'$ and $\epsilon''$ close to 1.866 and 3.257 for the fifth aerogel composite layer. This fifth sol-gel is then poured on top of the fourth agedlayer tothe desired layer thickness. The fifth sol-gel layer is then allowed to age for one to three days.

The third step involves transforming the stack of gels into aerogels using the $CO_2$ supercritical or hypercritical drying procedure outlined above in Section 1. The paper "Glasses from aerogels," J. Phalippou et al., J. Materials Science 25 (1990), 3111–3117, illustrates the use of $CO_2$ supercritical drying in the preparation of monolithic silica aerogels. In $CO_2$ supercritical drying, the alcohol solvent in the gel is replaced by $CO_2$ in the supercritical state. The experimental conditions for $CO_2$ supercritical drying in an autoclave are 50° C. and 7.5 MPa, The $CO_2$-alcohol solvent exchange can be assisted by such intermediate solvents as acetone or diethylether.

In the fourth step, a polyaniline network is formed with the aerogel by following a similar procedure to that described by Kramer, et al., "Polyaniline-ormasil nanocomposites," in "Ultrastructural Processing of Thin Crystalline Fils," id. This procedure involves soaking the aerogels in a solution containing the appropriate oxidant, e.g., ammonium peroxy disulfate. The aerogel is then washed to remove excess oxidant, and an aniline solution is added to each sample. The combination of aniline solution, oxidant, and the aniline molecular units covalently linked to the silica matrix results in a polyaniline network anchored to the silica matrix. The aerogel is then washed to remove unreacted aniline and unanchored aniline oligomers.

The final step is to expose the aerogel to an HCl vapor to create acid-complexed polyaniline,which is microwave-absorbing.

A variation on the above fabrication process is to form polyaniline networks within the five homogeneous, silica-$OSiMe_2$-aniline gel layers before these gels have been transformed into aerogels. The polyaniline networks within each gel are formed by following a procedure similar to that described by Kramer et al., "Polyaniline-ormasil nanocomposites," id. The concentration of polyaniline is different for each of the five gel layers. The specific concentrations should be those that result in the values of $\epsilon'$ and $\epsilon''$ cited for the aerogel layers described above. Polyaniline-silica aerogels are then prepared from the polyaniline-silica gels using the procedure described above.

Another possible fabrication process is to synthesize each aerogel layer separately, with the appropriate absorber loading, and then to assemble the layers together. The alternative fabrication process follows the alternative process described above in Section 3 for the silica-polar carborane aerogel composite with four differences. First the five homogeneous gels are prepared by the acid or base-catalyzed hydrolysis and condensation of mixtures of a) $SiMe_2OH$ bonded to either the meta- or para-carbon of aniline with b) a silicon tetraalkoxide, e.g., $Si(OEt)_4$, in the alcoholic media. The synthesis of aniline-$SiMe_2OH$ follows the procedure described in the co-pending U.S. patent application, Ser. No. 07/870,432, filed Apr. 16, 1992 and now U.S. Pat. No. 5,286,890, attorney docket PD-91401, entitled "Aromatic Amine Terminated Silicon Monomers, Oligomers and Polymers Thereof," by Thomas K. Dougherty, referenced above. The concentration of aniline-$SiMe_2OH$ is different for each of the five gels. The specific concentrations should be those that result in the values of $\epsilon'$ and $\epsilon''$ cited for the aerogel layers described in Sections 2 and 3.

Second, silica-$OSiMe_2$-aniline aerogels are prepared from the gels using conventional procedures, i.e., $CO_2$ supercritical drying in an autoclave.

Third, a polyaniline network is formed with each aerogel sample by following a similar procedure to that described by Kramer, et al., "Polyaniline-ormasil nanocomposites," id. This procedure involves soaking the aerogels in a solution containing the appropriate oxidant. The aerogels are then washed to remove excess oxidant, and an aniline solution is added to each sample. The combination of aniline solution, oxidant, and the aniline molecular units covalently linked to the silica matrix results in a polyaniline network anchored to the silica matrix. The aerogels are then washed to remove unreacted aniline and unanchored aniline oligomers. The concentration of polyaniline within each aerogel should be proportional to the concentration of aniline molecular units first bonded to the silica matrix. The final step is to wash the aerogels with an HCl solution to create acid-complexed polyaniline, which is microwave-absorbing.

Fourth, the silica $OSiMe_2$-polyaniline aerogel layers are shaped into the dimensions set forth above regarding fabrication of the silica-polar carborane aerogel composite, and then assembled into the five-layer discrete approximation to an exponential inhomogeneous layer absorber.

The above procedures could also be used to prepare an inhomogeneous layer with microwave energy-absorbing electron-conducting polymers other than polyaniline, e.g., polypyrrole.

B. Inhomogeneous Lossy Aerogel

The inhomogeneous lossy aerogel refers to an aerogel that is intrinsically a lossy dielectric, and whose dielectric properties vary across the thickness of the material. One type of inhomogeneous layer absorber fabricated from an inhomogeneous lossy aerogel is described.

1. Vitreous Carbon Aerogel

A five-layer discrete approximation to an exponential inhomogeneous layer absorber is described. Vitreous carbon is a known microwave absorber ("Radar Cross Section Handbook," Volume 2, id., at pp. 611–630; W. H. Emerson, IEEE Trans. on Antennas and Propagation AP-21, 484–489 (1973).

The first step in the fabrication process is to distribute over a period of time the initiation of the formation of five organic gels with the appropriate thicknesses. The specific times at which these gels are initiated and their specific thicknesses should be those that lead to the dielectric properties and thicknesses needed for a five-layer discrete approximation to an exponential inhomogeneous layer absorber (see above table and Table 8-6 in "Radar Cross Section handbook," Volume 2, id., at pp. 611–630.). The gel that defines the aerogel layer with the lowest values of $\epsilon'$ and $\epsilon''$ should age a minimum of three days. The gel that defines the aerogel layer with the highest values of $\epsilon'$ and $\epsilon''$ should age for several weeks. The longer the aging time and the higher the aging temperature of a gel, the greater its density and the greater the value of $\epsilon'$ and $\epsilon''$. These organic gels can be synthesized from the aqueous sol-gel polymerization of either resorcinol with formaldehyde, or melamine with formaldehyde, and are described in the following references (R. W. Pekala et al., "Organic aerogels: A new type of ultrastructured polymer," Report No.: DE91-008500, UCRL-SC-106520, CONF-910291, contract No: W-7405-ENG-48, Lawrence Livermore National Lab., Calif. Feb. 1991, paper presented at the 5th International Conference on Ultrastructural Processing of Ceramics, Glasses, Composites and Advanced Optical materials, Orlando, Fla. 17–21 Feb. 1991; L. M. Hair et al., "Low-density resorcinol-formaldehyde aerogels for direct-drive laser inertial confinement fusion targets," J. Vac. Sci. Technol. A, vol. 5, No. 4, Jul/Aug 1988.).

The second step is to stack the five gels so that the polymer networks at the interfaces can grow across the interfaces and bind the five gels into a single structure. The gels should be stacked according to their aging time, i.e., the oldest at the bottom and the youngest at the top. The five gel stack should then age for an additional one to three days.

The third step consists of $CO_2$ supercritical drying the single structure composed of the five different layers by following the procedure described in "Organic aerogels: A new type of ultrastructured polymer," id. Details of the drying are given in "Low density resorcinol-formaldehyde aerogels for the direct-drive laser inertial confinement fusion targets," L. M. Hair et al., id.

The fourth step is to follow the procedure described in "Organic aerogels: A new type of ultrastructured polymer," id., to pyrolyze the inhomogeneous organic aerogel at 1100° C. in an inert atmosphere at 1 atm. pressure to obtain an inhomogeneous vitreous carbon aerogel. This aerogel will therefore perform as an effective microwave-absorbing material. As shown in the above table, the thickness of the inhomogeneous aerogel will define the microwave frequency range over which the absorber will perform.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A broadband absorber of electromagnetic energy, comprising an aerogel-lossy dielectric composite, wherein the concentration of the lossy dielectric comprising said composite increases across the thickness of said composite, such that the dielectric properties of said composite vary from those of the aerogel comprising said composite at an air-absorber interface at one side of said absorber on which the electromagnetic energy is incident to those of said lossy dielectric at a second opposed side of said absorber.

2. The broadband absorber of claim 1 wherein said aerogel comprises an inorganic oxide.

3. The broadband absorber of claim 1 wherein said inorganic oxide aerogel is a silica aerogel.

4. The broadband absorber of claim 1 wherein said lossy dielectric comprises molecules of a material selected from the group consisting of water, propylene carbonate, nitromethane and methanol.

5. An inhomogeneous layer, broadband absorber of electromagnetic energy, comprising an intrinsically lossy dielectric aerogel, characterized in that the density of said aerogel is increased across its thickness so that the low density side of said aerogel at an air-absorber interface on which the electromagnetic energy is incident has high porosity with dielectric properties similar to those of air, and the high density side of said aerogel has relatively low porosity in relation to said low density side, and has dielectric properties similar to those of said lossy dielectric.

6. The broadband absorber of claim 5 wherein said aerogel is a vitreous carbon aerogel.

7. A broadband absorber of electromagnetic energy, characterized by a composite of multiple layers of homogeneous aerogel, each layer containing different concentrations of microwave energy absorbing molecules, wherein the respective concentrations of said molecules in the respective layers increase across the thickness of said composite, such that the dielectric properties of said composite vary from those of the aerogel comprising said composite on one side thereof at an air-absorber interface on which the electromagnetic energy is incident to those of said microwave energy absorbing molecules on the other side of said composite.

8. The broadband absorber of claim 7 wherein said aerogel comprises an inorganic oxide.

9. The broadband absorber of claim 8 wherein the thickness of said composite is determined by the lowest frequency of electromagnetic radiation to be absorbed.

10. A broadband absorber of electromagnetic energy, comprising an aerogel-lossy dielectric composite, wherein the concentration of the lossy dielectric comprising said composite increases across the thickness of said composite, such that the dielectric properties of said composite vary from those of the aerogel comprising said composite to those of said lossy dielectric, and wherein said lossy dielectric comprises polar icosahedral molecules.

11. The broadband absorber of claim 10 wherein said molecules comprise polar carborane molecules.

12. The broadband absorber of claim 11 wherein said molecules comprise ortho-carborane.

13. The broadband absorber of claim 11 wherein said molecules comprises meta-carborane.

14. A broadband absorber of electromagnetic energy, comprising an aerogel-lossy dielectric composite, wherein the concentration of the lossy dielectric comprising said composite increases across the thickness of said composite, such that the dielectric properties of said composite vary from those of the aerogel comprising said composite to those of said lossy dielectric, and wherein said lossy dielectric comprises a polyaniline electron-conducting polymer.

15. A broadband absorber of electromagnetic energy, characterized by a composite of multiple layers of homogeneous aerogel, wherein said aerogel is a silica inorganic oxide aerogel, each layer containing different concentrations of microwave energy absorbing molecules, wherein the respective concentrations of said molecules in the respective layers increases across the thickness of said composite, such that the dielectric properties of said composite vary from those of the aerogel comprising said composite on one side thereof to those of said microwave energy absorbing molecules on the other side of said composite.

16. The broadband absorber of claim 15 wherein said layers comprising said composite are assembled together by a polyurethane adhesive.

17. A broadband absorber of electromagnetic energy, characterized by a composite of multiple layers of homogeneous aerogel, each layer containing different concentrations of microwave energy absorbing molecules, said molecules comprising polar icosohedral molecules, wherein the respective concentrations of said molecules in the respective layers increases across the thickness of said composite, such that the dielectric properties of said composite vary from those of the aerogel comprising said composite on one side thereof to those of said microwave energy absorbing molecules on the other side of said composite.

18. The broadband absorber of claim 17 wherein said polar icosohedral molecules comprise polar carborane molecules.

19. The broadband absorber of claim 18 wherein said polar carborane molecules comprise ortho-carborane molecules.

20. The broadband absorber of claim 18 wherein said polar carborane molecules comprise meta-carborane molecules.

21. A method for fabricating a broadband absorber of electromagnetic radiation characterized by a multilayer composite of aerogels, each layer loaded with a different concentration of electromagnetic radiation absorbing molecules, comprising a sequence of the following steps:

providing a number of layers of homogeneous silica aerogels;

loading said aerogel layers with different concentrations of electromagnetic radiation absorbing molecules; and assembling said layers of loaded silica aerogels into said composite, wherein the concentration of said molecules increases across the thickness of said composite, such that the dielectric properties of said composite vary from those of said silica aerogel on side of said composite to the properties of said molecules on the other side of said composite.

22. The method of claim 21 wherein the thickness of said layers are substantially equal, and the thickness of said composite is determined by the lowest frequency of electromagnetic radiation to be absorbed.

23. The method of claim 21 wherein said step of loading said aerogel layers comprises vapor deposition of different amounts of said molecules into respective said layers.

24. The method of claim 23 wherein said molecules comprise polar icosahedral molecules.

25. The method of claim 23 wherein said molecules comprise polar carborane molecules.

26. The method of claim 23 wherein said molecules comprise meta-carborane molecules.

27. The method of claim 21 wherein said radiation absorbing molecules comprise molecules of a material selected from the group consisting of water, propylene carbonate, nitromethane and methanol.

28. The method of claim 21 wherein said step of loading said aerogel layers comprises the vapor deposition of said radiation absorbing molecules into said aerogels.

29. The method of claim 28 wherein said radiation absorbing molecules comprises ortho-carborane, and said vapor deposition step comprises for each aerogel:

placing said aerogel and a quantity of ortho-carborane in separate chambers;

evacuating air from said chambers;

while maintaining the container containing the aerogel at room temperature and heating the container containing the aerogel to produce a vapor pressure of ortho-carborane needed to impregnate the aerogel with the desired amount of ortho-carborane, permitting communication between the two containers to allow said vapor to impregnate said aerogel.

30. The method of claim 21 wherein said step of loading said aerogel layers comprises immersing said layers in respective solutions containing different concentrations of said molecules.

31. The method of claim 30 wherein said molecules comprise polar icosahedral molecules.

32. The method of claim 30 wherein said molecules comprise polar carborane molecules.

33. A method for fabricating a broadband absorber of electromagnetic radiation characterized by a multilayer composite of aerogel layers, each layer loaded with a different concentration of electromagnetic radiation absorbing polar carborane molecules, wherein said molecules are covalently attached to the aerogel network, comprising a sequence of the following steps:

fabricating a plurality of layers of homogeneous aerogels each containing different concentrations of microwave energy absorbing molecules; and assembling said layers of aerogels into said composite, wherein the concentration of said molecules increases across the thickness of said composite, such that the dielectric properties of said composite vary from those of the aerogel on one side of said composite to the properties of said molecules on the other side of said composite.

34. The method of claim 33 wherein said radiation absorbing molecules comprise ortho-carborane molecules.

35. The method of claim 33 wherein said molecules comprise meta-carborane molecules.

36. The method of claim 33 wherein said aerogel layers comprise silica aerogels, said molecules comprise polar carboranes, and said step of fabricating said plurality of layers comprises the following steps;

prepare a plurality of homogeneous gels by the hydrolysis and condensation of mixtures of $Si(OEt)_3$ or $SiMe_2OH$ bonded to one of the carbon atoms in ortho-carborane with a silicon tetraalkoxide in an alcoholic media, wherein the concentration of ortho-carborane-$Si(OEt)_3$ or $SiMe_2OH$ is different for each of said gels;

curing said gels at room temperature for a period of time;

drying said gels in an autoclave under a $CO_2$ supercritical drying procedure to remove the solvent from said gels and thereby form said aerogel layers; and processing said aerogel layers to obtain layer thicknesses determined by the number of layers and the wavelength of the lowest frequency of the electromagnetic radiation to be absorbed.

37. The method of claim 33 wherein said aerogel comprises a silica aerogel and said molecules comprise meta-carborane molecules.

38. A method for fabricating a broadband absorber of electromagnetic radiation characterized by a multilayer composite of aerogel layers, each layer loaded with a different concentration of electromagnetic radiation absorbing polyaniline in the acid-complexed or electron-conducting state, comprising a sequence of the following steps:

fabricating a plurality of layers of homogeneous aerogels each containing different concentrations of polyaniline in the acid-complexed or electron-conducting state; and assembling said layers of aerogels into said composite, wherein the concentration of said polyaniline increases across the thickness of said composite, such that the dielectric properties of said composite vary from those of the aerogel on one side of said composite to the properties of said polyaniline on the other side of said composite.

39. The method of claim 38 wherein said aerogel layers comprise silica aerogels, and said step of fabricating said plurality of layers comprises the following steps:

prepare a plurality of homogeneous gels by the hydrolysis and condensation of mixtures of $SiMe_2OH$ bonded to either the meta- or para-carbon of aniline with a silicon tetraalkoxide in an alcoholic media, wherein the concentration of aniline-$SiMe_2OH$ is different for each of said gels;

processing said gels to obtain silica-$OSiMe_2$-aniline aerogels;

forming an acid-complexed, microwave-absorbing polyaniline network within each aerogel layer; and processing said aerogel layers to obtain layer thicknesses determined by the number of layers and the wavelength of the lowest frequency of the electromagnetic radiation to be absorbed.

40. The method of claim 39 wherein said step of processing said gels comprises a sequence of the following steps:

soaking said gels in a solution containing a selected oxidant;

washing said gels to remove excess oxidant;

adding an aniline solution to each gel, wherein the combination of aniline solution, oxidant, and the aniline molecular units covalently linked to the silica matrix results in a polyaniline network anchored to the silica matrix comprising said aerogel layers;

washing said gels to remove unreacted aniline and unanchored aniline oligomers, wherein the concentration of polyaniline within each gel should be proportional to the concentration of aniline molecular units first bonded to the silica matrix; and washing said gels with an HCl solution to create microwave energy absorbing, acid-complexed polyaniline.

41. A method for fabricating a broadband absorber of electromagnetic radiation characterized by a multilayer composite of homogeneous aerogels, each layer comprising an intrinsically lossy dielectric aerogel, comprising a sequence of the following steps:

distribute over a period of time the initiation of the formation of a plurality of organic gel layers, in order to obtain layer thicknesses and dielectric properties which are required to provide a discrete approximation to an exponential inhomogeneous layer absorber;

stacking said layers;

curing said stacked layers over a period of time so that the polymer networks at the interfaces of adjacent layers can grow across the interfaces and bind the gel layers into a single structure, said period of time selected so that the densities of said respective gel layers provide the dielectric properties needed for said absorber, wherein the dielectric properties of one side of said composite at the air-aerogel interface resemble those of air, and the dielectric properties of the opposite side of said composite resemble those of said lossy dielectric;

$CO_2$ supercritical drying of said single structure in an autoclave; and pyrolyzing said single structure in an inert atmosphere to obtain an inhomogeneous vitreous carbon aerogel.

42. A method for fabricating a broadband absorber of electromagnetic radiation characterized by a multilayer aerogel, each layer loaded with a different concentration of electromagnetic radiation absorbing molecules, such that the dielectric properties of said aerogel vary across its thickness from those of the aerogel to those of said molecules, comprising a sequence of the following steps:

(a) preparing a first homogeneous sol-gel by the hydrolysis and condensation of mixtures of $Si(OEt)_3$ or $SiMe_2OH$ bonded to one of the carbon atoms in a polar carborane with a silicon tetraalkoxide in an alcoholic media, wherein the concentration of ortho-carborane-$Si(OEt)_3$ or ortho-carborane-$SiMe_2OH$ result in a desired dielectric characteristic for said sol-gel;

(b) pouring said first sol-gel into a container so that a sol-gel layer is formed with the desired thickness and allowing said sol-gel layer to age for a period of time;

(c) preparing a second sol-gel with a desired concentration of ortho-carborane-$Si(OEt)_3$ or ortho-carborane-$SiMe_2OH$ to result in a desired dielectric characteristic for said sol-gel;

(d) pouring said second sol-gel on top of said first sol-gel layer in said container to the desired layer thickness and allowing said second sol-gel to age for a period of time;

repeating steps (c) and (d) a sufficient number of times to obtain a desired number of layers for said aerogel.

43. A method for fabricating a broadband absorber of electromagnetic radiation characterized by a multilayer aerogel, each layer loaded with a different concentration of electromagnetic radiation absorbing polyaniline in the acid-complexed or electron-conducting state, such that the dielectric properties of said aerogel vary across its thickness from those of the aerogel to those of said molecules, comprising a sequence of the following steps:

(a) preparing a first homogeneous sol-gel by the acid or base-catalyzed hydrolysis and condensation of mixtures of $Si(OEt)_3$ or $SiMe_2OH$ bonded to either the meta- or para-carbon of aniline with a silicon tetraalkoxide in an alcoholic media, wherein the concentration of aniline-$SiMe_2OH$ results in a desired dielectric characteristic for said sol-gel;

(b) pouring said first sol-gel into a container so that a sol-gel layer is formed with the desired thickness and allowing said sol-gel layer to age for a period of time;

(c) preparing a second sol-gel with a desired concentration of aniline-$SiMe_2OH$ to result in a desired dielectric characteristic for said sol-gel;

(d) pouring said second sol-gel on top of said first sol-gel layer in said container to the desired layer thickness and allowing said second sol-gel to age for a period of time;

repeating steps (c) and (d) a sufficient number of times to obtain a sol-gel stack of layers having desired number of layers for said aerogel;

(e) transforming said sol-gel stack into an aerogel; and (f) processing said aerogel to form a polyaniline network in the aerogel which absorbs electromagnetic energy.

44. The method of claim 42 wherein said step(e) comprises the use of a $CO_2$ supercritical or hypercritical drying procedure.

45. The method of claim 43 wherein said step (f) comprises:

(1) soaking said aerogel in a solution containing an oxidant;

(2) washing said aerogel to remove excess oxidant;

(3) adding an aniline solution to said washed aerogel, wherein the combination of aniline solution, oxidant and the aniline molecular units covalently linked to the matrix comprising said aerogel results in a polyaniline network anchored to said matrix.

46. The method of claim 43 wherein said step (f) further comprises:

(4) exposing said aerogel with a polyaniline network to an HCl vapor to create an acid-complexed microwave-absorbing polyaniline.

* * * * *